Mar. 3, 1925.
L. A. WILCZEK
MOTION PICTURE SCREEN
Original Filed Nov. 27, 1920
1,528,591
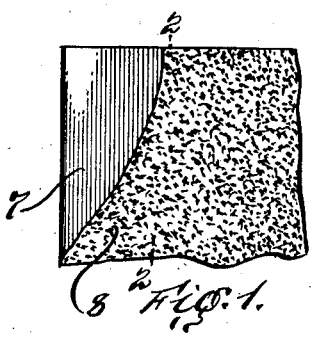
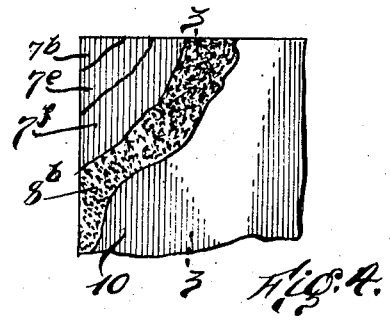
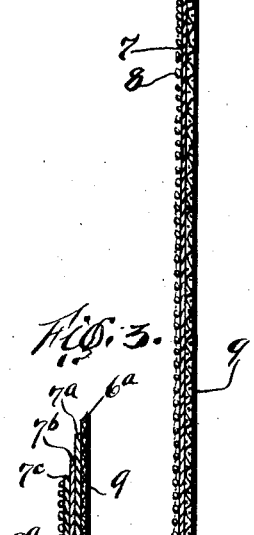
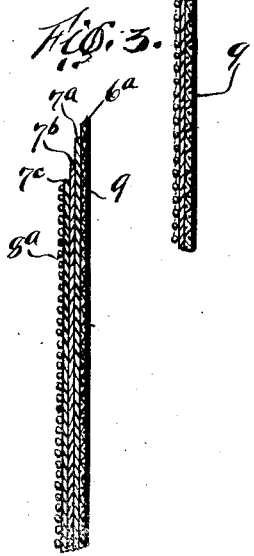
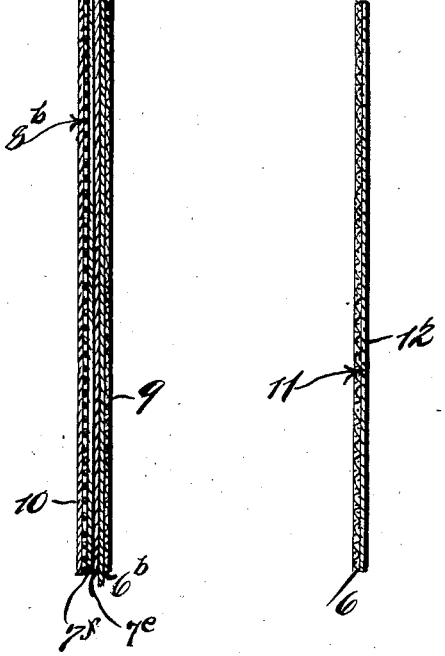
Inventor
Ludwic A. Wilczek.
By his Attorney Patented Mar. 3, 1925.

1,528,591

UNITED STATES PATENT OFFICE.

LUDWIC A. WILCZEK, OF NEW YORK, N. Y.

MOTION-PICTURE SCREEN.

Application filed November 27, 1920, Serial No. 426,694. Renewed August 9, 1924.

*To all whom it may concern:*

Be it known that I, LUDWIC A. WILCZEK, a citizen of Yugoslavia, residing at New York city, county and State of New York, have invented certain new and useful Improvements in Motion-Picture Screens, of which the following is a full, clear, and exact description.

My invention relates to screens used in connection with cinematograph projections, one of the objects being to provide a screen that can be kept free from dust, and also to materially increase the stereoptic effectiveness of the projected picture.

A further object of my invention is to provide a receiving screen that will reduce flickering, and hence avoid eye strain; that will prevent fading and distortion, and one that will more definitely and distinctly outline the matter cast thereupon. To produce the results desired, it is necessary to provide a perfect reflecting surface and a backing to prevent, so far as possible, light passing therethrough.

To accomplish this as cheaply and efficiently as possible, I apply to a sheet of fabric, preferably bleached or unbleached canvas, a combination of layers of paints, such as enamels, or transparent flexible lacquers and beads, pearls, mica or other shining refractory material, as will hereinafter more fully appear.

I find that I can obtain the results desired by various combinations placed on the front and rear surfaces of the canvas body. The rear surface of said body will have applied thereto a black coating, or a layer or layers of white, next to the canvas, and a layer or layers of black applied to the white layer or layers. Instead of using a black backing, I may use a coating of aluminum or bronze or other material that will obstruct the passage of light.

In the drawing accompanying this specification,

Fig. 1 illustrates a fragmentary view of a screen made in accordance with my invention, the outer layer of the reflecting surface of the screen being broken away;

Fig. 2 is an enlarged sectional view, the section being taken on a line 2—2 in Fig. 1;

Fig. 3 is a view similar to Fig. 2 of another embodiment of my invention;

Fig. 4 is a view similar to Fig. 1, illustrating a face view of a screen made in accordance with the form illustrated in Fig. 6, some of the outer layers being broken away;

Fig. 5 is a sectional view, illustrating a modified form of backing for screens made in accordance with the forms illustrated in Fig. 1 or Fig. 4; and Fig. 6 is a sectional view taken on line 3—3 in Fig. 4.

To form a screen in accordance with my invention, I provide a sheet 6 of suitable material, preferably canvas, either bleached or unbleached. To one surface of the sheet, which I will term the front surface, I apply a layer or layers of a white paint, indicated by 7, over which is applied a layer or layers of white enamel paint; before the enamel is dry, I cover the same with beads, pearls, mica, or other similar light reflecting substances, indicated by 8. To the opposite or rear surface of the canvas sheet, I apply a dark, preferably black, substance, such as paint, or I may employ aluminum, rubber or other dark fabrics, in its stead, said backing being indicated by 9 in Figs. 2 and 3, or I may employ a white backing or a white backing covered with a black backing.

Another form of my invention consists of a canvas body $6^a$, Fig. 3; then a layer or layers of white paint $7^a$; then a layer of white enamel $7^b$; then a layer or layers of transparent flexible varnish or lacquer $7^c$ and to this last layer of varnish or lacquer, I apply a layer of beads or other reflecting elements $8^a$. The backing for this form of screen may be in the form of black paint 9 or a layer of white paint, or a layer of white paint 11, covered with black 12. (See Fig. 5.)

Another form of my invention consists of a canvas $6^b$ to the front of which I apply a layer or layers of white paint $7^d$; then a layer or layers of white enamel paint $7^e$; then a layer or layers of transparent flexible varnish or lacquer $7^f$. To this latter layer, I apply a layer of beads $8^b$ or other reflecting elements. To the outer surface of the beads I apply a layer or layers of transparent flexible varnish or lacquer 10, which fills out the spaces between the beads to produce a smooth surface, thereby increasing the quality of the picture. To the rear surface of the canvas, I apply a dark or black backing, or a white backing, or a white backing covered with a black backing.

I also wish it to be understood that all the foregoing combinations can be repeated as well in the front as in the rear as many times as desired.

Wherever in the foregoing specification and claims I employ the term "varnish or lacquer," I desire it understood that any equivalent transparent and flexible binder is intended to be covered thereby.

What I claim and desire to secure by Letters Patent is:—

1. A motion picture screen, a backing member having in the front reflecting elements embedded in a transparent flexible varnish and covered with another layer of transparent flexible varnish, so that the reflecting elements will be embedded between two layers of transparent flexible varnish, and in the rear a black backing.

2. A motion picture screen, a backing member having in the front reflecting elements embedded in a transparent flexible varnish and covered with another layer of transparent flexible varnish, so that the reflecting elements will be embedded between two layers of transparent flexible varnish, and having in the rear a white backing.

3. A motion picture screen, a backing member having in front reflecting material embedded in transparent flexible varnish, and covered with transparent flexible varnish and having in the rear a surface of reflecting material embedded in transparent flexible varnish, and covered with transparent flexible varnish.

4. A motion picture screen, a backing member having in front reflecting material embedded in transparent flexible varnish, and covered with transparent flexible varnish and having in the rear a surface of reflecting material embedded in transparent flexible varnish, and covered with transparent flexible varnish, and a white backing.

5. A motion picture screen, a backing member having in front reflecting material embedded in transparent flexible varnish or lacquer, and covered with transparent flexible varnish or lacquer, and having in the rear a surface of reflecting material embedded in transparent flexible varnish, and covered with transparent flexible varnish, and a white backing covered with a black backing.

6. A motion picture screen, a backing member having in the front reflecting elements embedded in a transparent flexible varnish and covered with another layer of transparent flexible varnish so that the reflecting elements will be embedded between two layers of transparent flexible varnish, and having in the rear a white backing covered with a black backing.

7. A motion picture screen, a backing member having in front reflecting material embedded in transparent flexible varnish and covered with transparent flexible varnish and having in the rear a surface of reflecting material embedded in transparent flexible varnish and covered with transparent flexible varnish, the transparent flexible varnish last named being covered by a black backing.

Signed at New York city, N. Y., this 26 day of November, 1920.

LUDWIC A. WILCZEK.

Witnesses:
 EDWARD A. JARVIS,
 MAURICE BLOCK.